United States Patent
Chen et al.

(10) Patent No.: US 8,515,481 B2
(45) Date of Patent: *Aug. 20, 2013

(54) POWER MANAGEMENT FOR MULTI-CARRIER TRANSMISSION

(75) Inventors: Yih-Shen Chen, Hsinchu (TW); Chung-Hsien Hsu, Taichung (TW)

(73) Assignee: Mediatek Inc. (TW)

(*) Notice: Subject to any disclaimer, the term of this patent is extended or adjusted under 35 U.S.C. 154(b) by 678 days.

This patent is subject to a terminal disclaimer.

(21) Appl. No.: 12/584,396

(22) Filed: Sep. 3, 2009

(65) Prior Publication Data

US 2010/0061284 A1    Mar. 11, 2010

Related U.S. Application Data

(60) Provisional application No. 61/094,523, filed on Sep. 5, 2008, provisional application No. 61/094,553, filed on Sep. 5, 2008.

(51) Int. Cl.
*H04B 7/00* (2006.01)

(52) U.S. Cl.
USPC ............... 455/522; 455/69; 455/70; 370/315; 370/316; 370/317; 370/318; 370/319

(58) Field of Classification Search
USPC ...................... 455/522, 69–70; 370/318–320
See application file for complete search history.

(56) References Cited

U.S. PATENT DOCUMENTS

| | | | |
|---|---|---|---|
| 7,277,737 B1 | 10/2007 | Vollmer et al. | 455/574 |
| 2001/0006888 A1* | 7/2001 | Posti et al. | 455/69 |
| 2006/0031924 A1 | 2/2006 | Kwon et al. | 726/2 |
| 2006/0285526 A1 | 12/2006 | Jang et al. | 370/338 |
| 2007/0091817 A1 | 4/2007 | Yoon et al. | 370/252 |
| 2008/0305822 A1 | 12/2008 | Li et al. | 455/522 |
| 2009/0257387 A1 | 10/2009 | Gholmieh et al. | 370/329 |

(Continued)

FOREIGN PATENT DOCUMENTS

| EP | 2068580 | 6/2009 |
|---|---|---|
| JP | 2004320153 | 11/2004 |

(Continued)

OTHER PUBLICATIONS

Office Action dated Feb. 23, 2012 for U.S. Appl. No. 12/924,196 (10 pages).

(Continued)

*Primary Examiner* — Fayyaz Alam
(74) *Attorney, Agent, or Firm* — Imperium Patent Works; Zheng Jin (57) ABSTRACT

A method of power management for a mobile station in a multi-carrier wireless network is provided. A primary connection between the mobile station and a serving base station is first established by performing initial ranging over a primary radio frequency (RF) carrier. A secondary connection between the mobile station and the base station is then established by performing periodic ranging over a secondary RF carrier. To achieve efficient power management, the mobile station performs Open Loop Power Control and obtains long-term link measurement (CSI) of the primary carrier. The mobile station then adjusts carrier-specific parameters based on the primary carrier CSI. For RF carriers that convey ongoing data traffic, Close Loop Power Control is updated per RF carrier. When the mobile station enters sleep mode operation, it receives traffic indication messages on the primary RF carrier and then dynamically wakes up one or more corresponding RF carriers for data reception.

17 Claims, 6 Drawing Sheets

(56) References Cited

U.S. PATENT DOCUMENTS

| | | | |
|---|---|---|---|
| 2009/0274120 A1* | 11/2009 | Chou | 370/331 |
| 2010/0003973 A1 | 1/2010 | Kashiwase et al. | 455/422.1 |
| 2010/0061284 A1 | 3/2010 | Chen et al. | 370/311 |
| 2010/0331036 A1* | 12/2010 | You et al. | 455/522 |
| 2011/0116430 A1 | 5/2011 | Kim et al. | 370/311 |
| 2011/0117953 A1* | 5/2011 | Kim et al. | 455/522 |
| 2012/0149427 A1* | 6/2012 | Perets et al. | 455/522 |

FOREIGN PATENT DOCUMENTS

| | | |
|---|---|---|
| JP | 200835283 | 2/2008 |
| TW | 200414707 | 8/2004 |
| WO | WO2007145419 | 12/2007 |
| WO | WO2008025239 | 2/2008 |

OTHER PUBLICATIONS

International Search Report and Written Opinion of International Search Authority for PCT/CN2009/073746 dated Dec. 10, 2009 (10 pages).

Office Action, for related U.S. Appl. No. 12/924,196, dated Jul. 27, 2012(20 pages).

JP Office Action of Japanese patent application 2011-525397, dated Jan. 8, 2013(10 pages).

IEEE C802.16m-08/318, I-Kang Fu et al., "Uplink Control Structure, Ranging and Initialization Procedure with Multi-Carrier Support for IEEE 802.16m", dated May, 5, 2008 (7 pages).

IEEE C802.16m-08/569r1, Yih-Shen Chen et al., "Joint Power Control and Link Adaptation Scheme for IEEE802.16m", dated Jul. 12, 2008 (5 pages).

IEEE C802.16m-08/666r2, Ali Taha Koc et al., "Uplink Power Control Recommendations for IEEE802.16m", Jul. 13, 2008 (17 pages).

IEEE C802.16m-08/765r2, Lina Liu et al., "Proposed Power Management for Multi-Carrier Support", dated Jul. 16, 2008 (3 pages).

Yan Zhang and Masayuki Fujise, "Energy Management in the IEEE 802.16e MAC", Communications Letters, IEEE, Aro. 2006, vol. 10, No. 4, pp. 311-313 (4 pages).

Taiwan IPO Office Action of Taiwan patent application 098129853 dated Mar. 29, 2013 (5 pages).

* cited by examiner (PRIOR ART)
FIG. 1

POWER MANAGEMENT FLOW CHART FOR
CARRIER ACTIVATION

FIG. 4

POWER MANAGEMENT FLOW CHART FOR LINK MAINTENANCE

POWER MANAGEMENT FLOW CHART FOR SLEEP MODE OPERAITON

POWER MANAGEMENT FOR MULTI-CARRIER TRANSMISSION

CROSS REFERENCE TO RELATED APPLICATIONS

This application claims priority under 35 U.S.C. §119 from U.S. Provisional Application No. 61/094,523, entitled "Power Control Method for Multi-Carrier Transmission," filed on Sep. 5, 2008; U.S. Provisional Application No. 61/094,553, entitled "Sleep Mode Operation Design for Multi-band Broadband Wireless Access Systems," filed on Sep. 5, 2008, the subject matter of which is incorporated herein by reference.

TECHNICAL FIELD

The disclosed embodiments relate generally to power management, and, more particularly, to power management in multi-carrier wireless communications systems.

BACKGROUND

In current wireless communications systems, 5 MHz~20 MHz radio bandwidths are typically used for up to 100 Mbps peak transmission rate. Much higher peak transmission rate is required for next generation wireless systems. For example, 1 Gbps peak transmission rate is required by ITU-R for IMT-Advanced systems such as the $4^{th}$ generation ("4G") mobile communications systems. The current transmission technologies, however, are very difficult to perform 100 bps/Hz transmission spectrum efficiency. In the foreseeable next few years, only up to 15 bps/Hz transmission spectrum efficiency can be anticipated. Therefore, much wider radio bandwidths (i.e., at least 40 MHz) will be necessary for next generation wireless communications systems to achieve 1 Gbps peak transmission rate.

Orthogonal Frequency Division Multiplexing (OFDM) is an efficient multiplexing protocol to perform high transmission rate over frequency selective channel without the disturbance from inter-carrier interference. There are two typical architectures to utilize much wider radio bandwidth for OFDM system. In a traditional OFDM system, a single radio frequency (RF) carrier is used to carry one wideband radio signal, and in an OFDM multi-carrier system, multiple RF carriers are used to carry multiple narrower band radio signals. The multi-carrier operation is also known as carrier aggregation or bandwidth extension. An OFDM multi-carrier system has various advantages as compared to a traditional OFDM system such as lower Peak to Average Power Ratio, easier backward compatibility, and more flexibility. Thus, OFDM multi-carrier wireless systems have become the baseline system architecture in IEEE 802.16m and LTE-Advanced draft standards to fulfill system requirements.

In a multi-carrier environment, there exists some channel relationship among different RF carriers. For example, pathloss and shadowing fading are typically the same for all RF carriers. When RF carriers span over a continuous RF band, its channels are highly correlated. It is thus possible to exploit channel correlation for carrier activation process. In addition, Open Loop Power Control (OLPC) is preferred to provide efficient power management. On the other hand, short-term fading is frequency-selective, and Interference over Thermal (IoT) may also be carrier-dependent due to scheduling and carrier properties. For example, IoT is carrier-specific if each RF carrier is applied in different fractional frequency reuse (FFR) region. As a result, Close Loop Power Control (CLPC) per RF carrier is required for RF carriers conveying on-going data traffic.

In order to minimize power consumption, a mobile station (MS) sometimes enters sleep mode operation, during which the MS conducts pre-negotiated periods of absent time from its serving bas station (BS). When sleep mode operation is active, a series of alternating listening windows followed by sleep windows are provided for the MS. In each listening window, the MS wakes up to receive and transmit data packets. In each sleep window, the serving BS does not transmit any data packets to the MS. Traffic indication is executed by the BS during the MS's listening window, a procedure for the BS to indicate whether any downlink traffic allocation is addressed to the MS. In multi-carrier sleep mode operation, more than one RF carrier may be used to execute the traffic indication procedure. In addition, more than one RF carrier may be awakened for data transmission.

Figure 1:
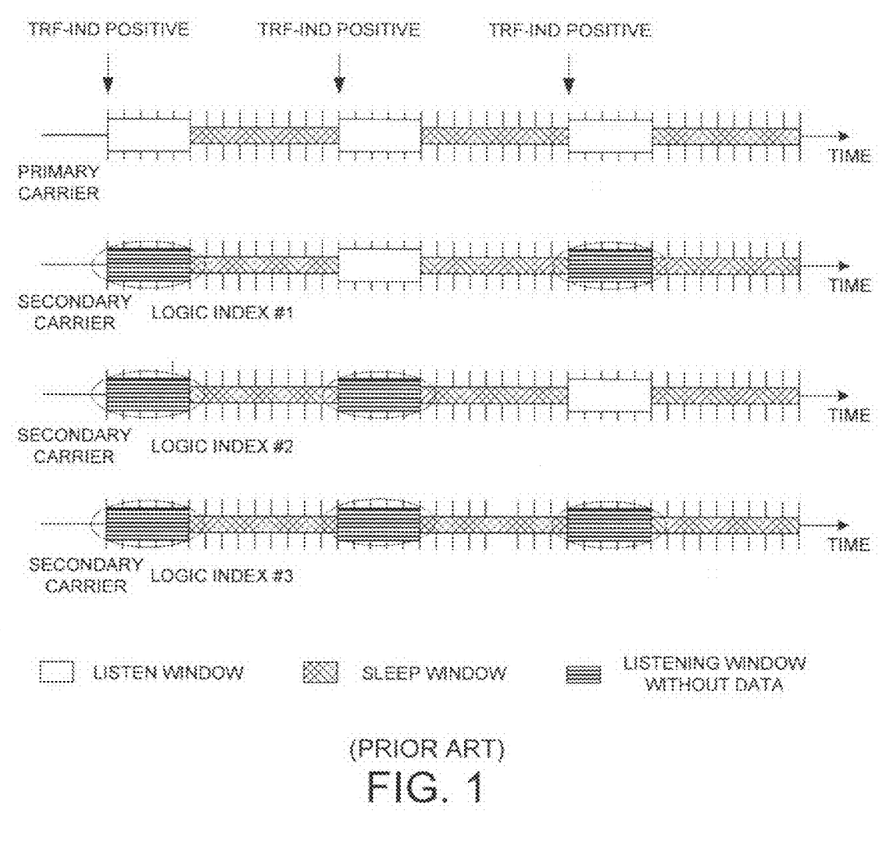
FIG. 1 (Prior Art) illustrates an example of multi-carrier sleep mode operation using "wakeup all" method.

FIG. 1 (prior art) illustrates an example of multi-carrier sleep mode operation using "wakeup all" method. As illustrated in FIG. 1, a primary RF carrier is used to execute the traffic indication procedure. When the MS receives traffic indication message (TRF-IND) via primary carrier, all secondary carriers are awakened at the same time regardless of whether TRF-IND indicates data arrival or not. However, such "wakeup all" method introduces power wasting when there is no data to be received for some of the listening windows. Other solutions have been sought to provide more efficient power management for multi-carrier sleep mode operation. For example, Ericsson has proposed to the LTE-Advanced draft standards that Discontinuous Downlink Reception (DRX) parameters may be configured for one component carrier independently of other component carriers (see R2-092959, Apr. 28, 2009). While this proposal increases scheduling flexibility, it also unnecessarily wakes up the MS for non-periodic services.

SUMMARY

A method of power management for a mobile station in a multi-carrier wireless network is provided. A primary connection between the mobile station and a serving base station is first established by performing initial ranging over a primary radio frequency (RF) carrier. Initial ranging procedure is used by the mobile station to evaluate and modify physical layer parameters such as power, frequency, and timing of its transmission with the serving base station. A secondary connection between the mobile station and the base station is then established by performing periodic ranging over a secondary RF carrier. In one novel aspect, to achieve efficient power management in carrier activation, the mobile station uses the same timing, frequency and power adjustment parameters for the secondary RF carrier as in the primary RF carrier for initial transmission. By performing optional periodic ranging without performing initial ranging, the mobile station is able to have more power saving in activating the secondary RF carrier.

To achieve efficient power management in link maintenance, the mobile station performs Open Loop Power Control (OLPC) and obtains long-term link measurement, also referred to as Channel State Information (CSI), of the primary carrier. The mobile station then derives Carrier-Offset parameter and adjusts carrier-specific parameters based on the primary carrier CSI and the Carrier-Offset parameter. For RF carriers that convey on-going data traffic, Close Loop Power Control (CLPC) is updated carrier-by-carrier.

In one embodiment, the mobile station (MS) enters sleep mode operation to minimize power consumption. Before entering sleep mode operation, the mobile station first negotiates sleep cycle parameters with the serving base station. The mobile station then enters sleep mode operation and receives traffic indication messages on the primary RF carrier during each listening window. The mobile station then dynamically wakes up one or more corresponding RF carriers for data reception if traffic indication message indicates positive data traffic for the one or more corresponding RF carriers. The one or more corresponding RF carriers may be identified by a wakeup indication message.

In one example of multi-carrier sleep mode operation, the serving base station sends a MAC management message requesting the mobile station to change its primary carrier to another activated carrier upon entering the sleep mode operation or during the listening window. Such primary carrier switching is performed to enhance reliability and power saving in case of channel quality deterioration, and to achieve better Quality of Service or load balancing. A status bit may be included in the MAC management message indicating whether the main purpose of the next listening window is used to receive data traffic or to detect the downlink resource allocation MAC management messages that indicate arrival of data traffic.

In another example of multi-carrier sleep mode operation, if data traffic is highly predictable, then the mobile station may be ready to receive data traffic on one or more pre-designated carriers without detecting any traffic indicator. The pre-designated RF carriers simply wake up at pre-allocated listening window to transmit and receive data traffic.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 2:
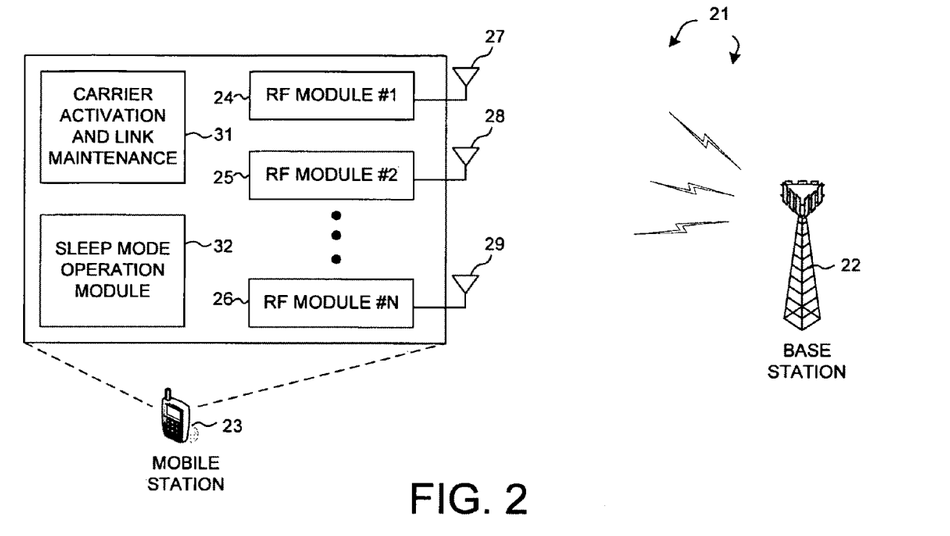
FIG. 2 is a simplified diagram of a multi-carrier wireless network in accordance with one novel aspect.

FIG. 2 is a simplified diagram of a multi-carrier wireless network 21 in accordance with one novel aspect. Multi-carrier wireless network 21 comprises a multi-carrier serving base station (BS) 22 and a multi-carrier mobile station (MS) 23. MS23 comprises a plurality of radio frequency (RF) modules, depicted in FIG. 1 as RF module 24 (RF module #1) coupled to antenna 27, RF module 25 (RF module #2) coupled to antenna 28, and RF module 26 (RF module #N) coupled to antenna 29. Different RF modules are operable to receive and transmit data over different RF carriers. For example, RF module #1 is operable over a first RF carrier #1 and RF module #2 is operable over a second RF carrier #2. MS23 also comprises a novel carrier activation and link maintenance module 31 and a novel sleep-mode operation module 32, which provide efficient power management.

Figure 3:
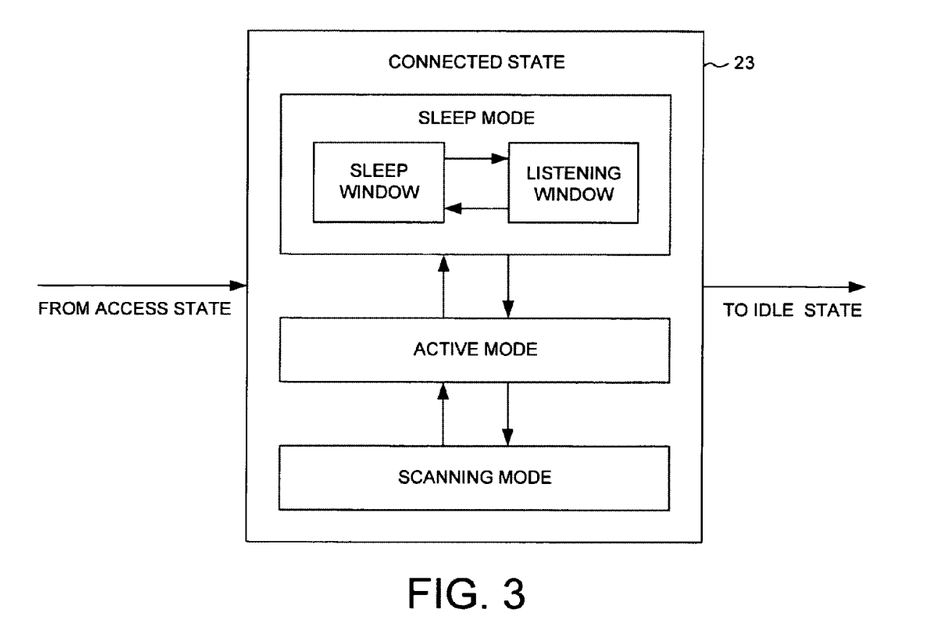
FIG. 3 is a simplified diagram of a multi-carrier mobile station in connected state in accordance with one novel aspect.

FIG. 3 is a simplified diagram of MS23 operating in connected state in accordance with one novel aspect. As illustrated in FIG. 3, MS23 has different operational states such as access state, connected state, and idle state. MS23 operates in connected state when it enters wireless network 21 by activating one or more RF carriers and completes related capability negotiation and registration operations over the one or more RF carriers with its serving BS22. In LTE, the corresponding state of the connected state is referred to as "RRC connected state." Within the connected state, MS23 has different operation modes, such as sleep mode, active mode, and scanning mode. During active mode operation, MS23 actively receives and transmits data packets with its serving BS22. In order to minimize power consumption, MS23 sometimes enters sleep mode operation, during which MS23 conducts pre-negotiated periods of absent time from its serving BS22. In addition, MS23 sometimes enters scanning mode operation to perform necessary measurements of neighboring base stations. Scanning mode operation is similar to sleep mode operation in the concept of data transmission, that is, MS23 scans neighboring cells during each sleep window and receives downlink data during each listening window. Therefore, power management of a mobile station in connected stat is related to both active mode and sleep mode. During both active mode operation and sleep mode operation in a multi-carrier environment, efficient power management and power saving are achieved by carrier activation and link maintenance module 31 and sleep mode operation module 32.

Figure 4:
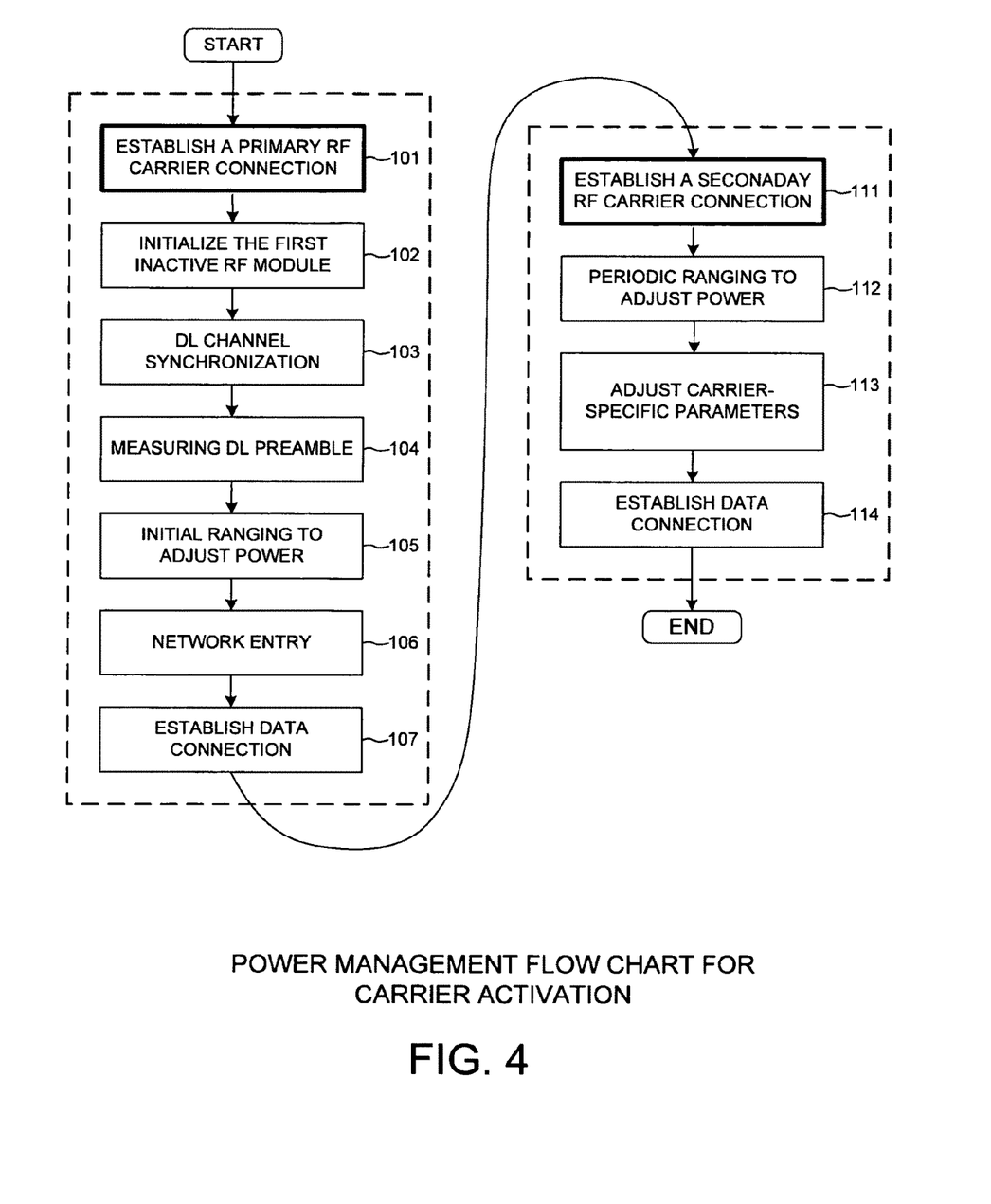
FIG. 4 is a power management flow chart for carrier activation of a multi-carrier mobile station.

FIG. 4 is a power management flow chart for carrier activation of a multi-carrier mobile station during active mode operation. For carrier activation, a primary RF carrier connection is first established (step 101). Carrier activation of a primary RF carrier includes steps 102 to 107. First, a first inactive RF module of the mobile station is initialized (step 102). The initialized RF module is operable over an RF carrier that is referred to as the primary RF carrier. Downlink (DL) channel synchronization between the mobile station and its serving base station is then performed (step 103). Downlink (DL) preamble is also measured (step 104). Next, the mobile station performs initial ranging over the primary RF carrier (step 105). Initial ranging procedure is used by the mobile station to evaluate and modify physical layer parameters such as power, frequency, and timing of its transmission with the serving base station. After initial ranging, the mobile station performs network entry procedure and completes capability negotiation and registration operation with the serving base station over the primary RF carrier (step 106). Finally, a primary carrier connection between the mobile station and the serving base station is established over the primary RF carrier (step 107).

In a multi-carrier environment, in addition to the primary carrier connection, a secondary carrier connection may be established over a secondary RF carrier between the mobile station and its serving base station (step 111). The carrier activation of a secondary RF carrier includes steps 112 to 114. First, the mobile station performs periodic ranging upon activation of the secondary RF carrier if necessary (step 112). To perform periodic ranging, the mobile station starts with the timing, frequency, and power of the primary RF carrier for initial transmission and then derives "Carrier-Offset" parameters for the secondary RF carrier. Next, the mobile station adjusts carrier-specific parameter based on the Carrier-Offset (step 113). That is, CSI_secondary=CSI_primary+Carrier-Offset. In the meantime, the mobile station only keeps measuring long-term link measurement (also referred to as Connection State Information (CSI)) CSI_primary for the primary carrier. Finally, a secondary carrier connection is established over the secondary RF carrier (step 114). In one novel aspect, the mobile station does not need to perform initial ranging in activating the secondary RF carrier. Instead, the mobile station performs periodic ranging only if necessary. If periodic ranging is also skipped, then the same timing, frequency, and power setting of the primary RF carrier are applied for the secondary RF carrier. By performing optional periodic ranging without performing the initial ranging procedure, the mobile station is able to have more power saving in activating the secondary RF carrier.

Figure 5A:
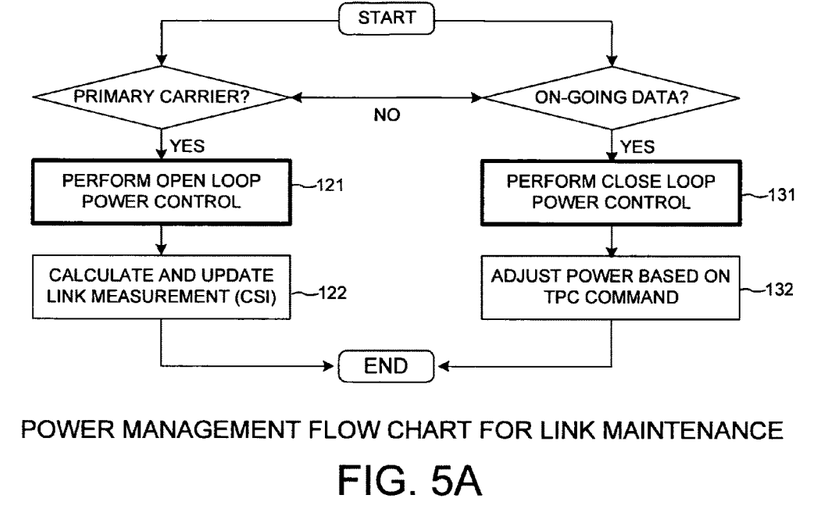
FIG. 5A is a power management flow chart for link maintenance of a multi-carrier mobile station.

FIG. 5A is a power management flow chart for link maintenance of a multi-carrier mobile station after the primary carrier connection and the secondary carrier connection are established. For the primary RF carrier, the mobile station performs Open Loop Power Control (OLPC) for link maintenance (step 121). More specifically, such OLPC involves periodically calculating and updating long-term link measurement, also referred to as Connection State Information (CSI), without using any feedback mechanism (step 122). In one novel aspect, the long-term link measurement (CSI) for OLPC parameters is performed in the primary RF carrier only, while power update is done per RF carrier with the same CSI. Thus, the mobile station is able to have more power saving because OLPC parameters are applied in all RF carriers without measuring the secondary carriers. On the other hand, Close Loop Power Control (CLPC) is required per RF carrier for primary or secondary RF carriers that convey on-going data traffic (step 131). More specifically, the power update in CLPC is done carrier-by-carrier using specific Transmission Power Control (TPC) command.

Figure 5B:
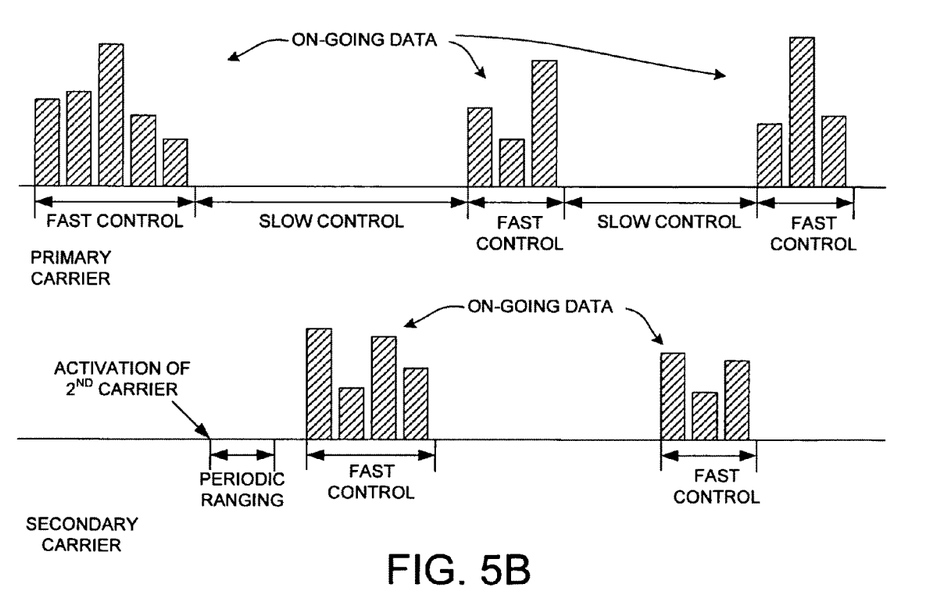
FIG. 5B illustrates open loop power control and close loop power control in a multi-carrier environment.

FIG. 5B is a diagram that illustrates Open Loop Power Control and Close Loop Power Control in a multi-carrier environment. As illustrated in FIG. 5B, for the primary RF carrier, the mobile station performs OLPC (i.e., slow control as depicted in FIG. 5B) when it does not convey on-going data traffic, and performs CLPC (i.e., fast control as depicted in FIG. 5B) when it conveys on-going data traffic. On the other hand, for the secondary RF carrier, the mobile station performs CLPC (i.e., fast control as depicted in FIG. 5B) when it conveys on-going data traffic.

Figure 6:
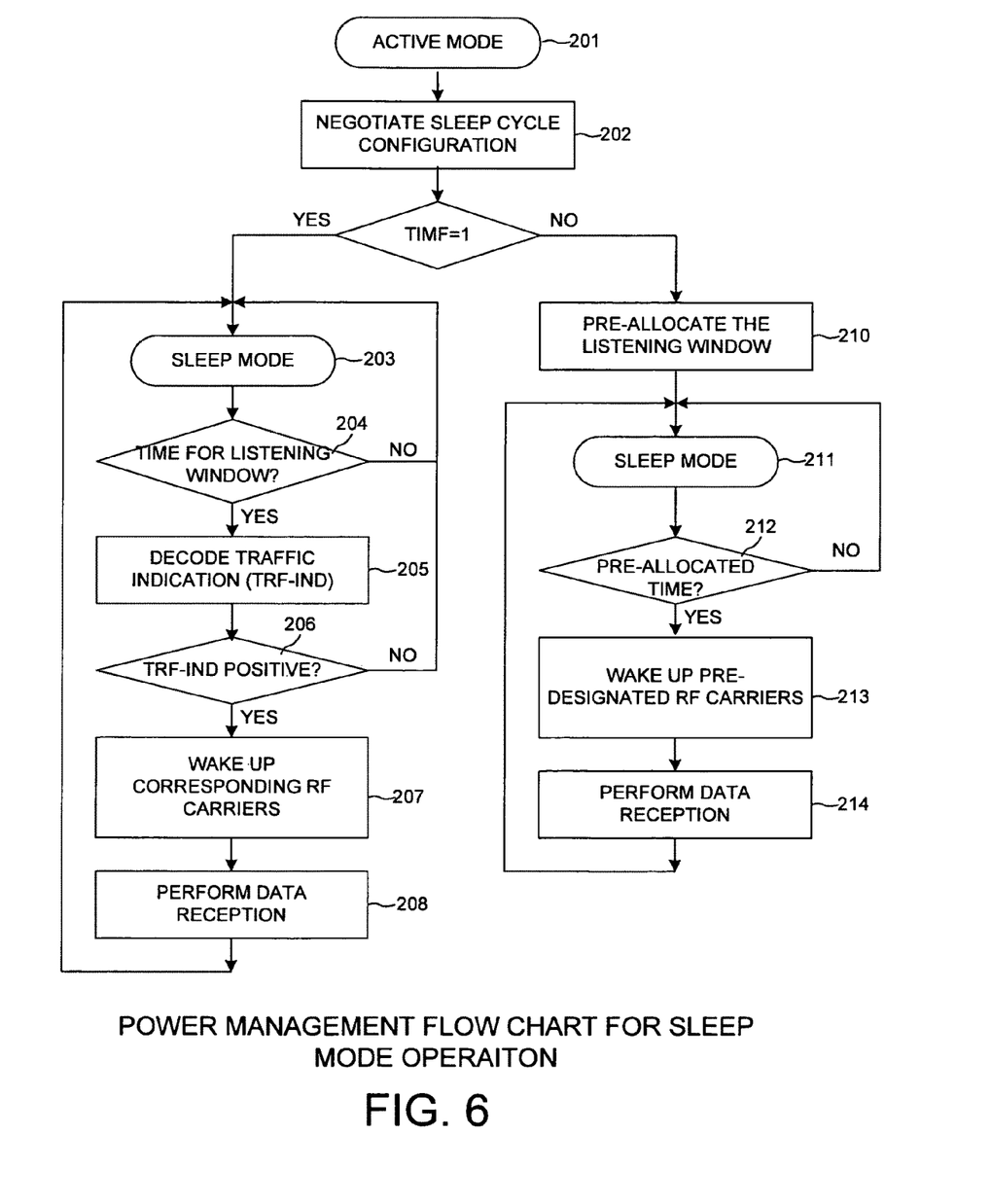
FIG. 6 is a power management flow chart for multi-carrier sleep mode operation.

In addition to carrier activation and link management in active mode operation, power saving in sleep mode operation is also desirable. FIG. 6 is a power management flow chart for multi-carrier sleep mode operation of a mobile station. When sleep mode operation is active, a series of sleep cycles having alternating listening window followed by sleep window are provided for the mobile station. In each sleep window, the serving base station does not transmit any data packets to the mobile station. In each listening window, the mobile station is expected to wake up and transmit/receive data packets as in active mode operation. During each listening window, the serving base station may transmit a traffic indication message to the mobile station to indicate whether any downlink traffic allocation is addressed.

As illustrated in FIG. 6, the mobile station starts with active mode operation (step 201). Before entering sleep mode operation, the mobile station negotiates sleep cycle parameters with the serving base station (step 202). The sleep cycle parameters include sleep cycle length, listening window length, and whether traffic indication is enabled during each listening window. If traffic indication is enabled (depicted as TIMF=1 in FIG. 6), then the mobile station enters sleep mode operation (step 203) and waits for the next listening window (step 204). If it is time for the next listening window, then the mobile station receives a traffic indication (TRF-IND) message and decodes the content of the TRF-IND message (step 205). IF the TRF-IND message indicates negative data traffic, then the mobile station goes back to sleep mode. If the TRF-IND message indicates positive data traffic, then the mobile station wakes up corresponding RF carriers (step 207) for data transmission and reception (step 208).

In one novel aspect, traffic indication is always executed on the mobile station's primary RF carrier. The serving base station transmits TRF-IND messages on the mobile station's primary RF carrier. The mobile station receives and decodes the TRF-IND messages on its primary RF carrier and wakes up corresponding RF carriers to process data traffic. The corresponding RF carriers to be awakened are the activated secondary RF carriers identified by a wakeup indication message. By executing wakeup indication on demand, more power savings can be achieved because RF carriers will not be awakened if there is no data to be processed in the upcoming listening window.

Figure 7:
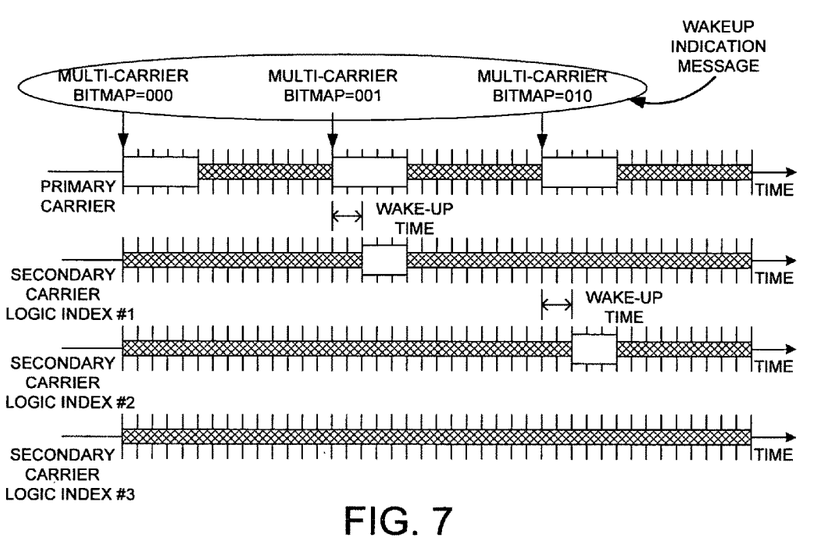
FIG. 7 illustrates an example of multi-carrier sleep mode operation using wakeup indication.

FIG. 7 illustrates an example of multi-carrier sleep mode operation of a mobile station using wakeup indication method. The mobile station supports four RF carriers, one primary carrier and three secondary carriers with logic indexes #1, #2, and #3 respectively. As illustrated in FIG. 7, the mobiles station receives wakeup indication messages from the serving base station on its primary carrier during each of the listening windows. The wakeup indication message may be in the form of a bitmap, with each bit representing whether an associated RF carrier needs to be awakened in the upcoming listing window. The wakeup indication message may also be a number that represents the logic index of an RF carrier to be awakened in the upcoming listening window. In one embodiment, the wakeup indication message is an independent MAC message. In another embodiment, the wakeup indication message is part of a TRF-IND message.

In the example of FIG. 7, each wakeup indication message is in the form of a multi-carrier bitmap. The first multi-carrier bitmap is equal to 000, which indicates that none of the secondary carriers needs to be awakened. The second multi-carrier bitmap is equal to 001, which indicates that the secondary carrier with logic index #1 needs to be awakened in the upcoming listening window for data reception. Similarly, the third multi-carrier bitmap is equal to 010, which indicates that the secondary carrier with logic index #2 needs to be awakened in the upcoming listening window for data reception. From the time the mobile station receives the wakeup indication message, it takes an additional Wakeup Time for the mobile station to wake up the corresponding RF carriers. This Wakeup Time is a critical system parameter and may be exchanged in initial network entry procedure (or "cell camping" in 3GPP terminology) or sleep mode negotiation process. The value is related to the mobile station's terminal capability and can be negotiated between the mobile station and the serving base station.

In addition to wakeup indication messages, the serving base station may also send other types of MAC management messages to the mobile station. The serving base station may send a MAC message indicating that the main purpose of the next listening window is used for detecting traffic (i.e., detection of TRF-IND) instead of receiving traffic. For example, the serving base station may send a MAC management message requesting the mobile station to change its primary carrier to another activated carrier upon entering the sleep mode operation or during the listening window. Such primary carrier switching is performed to enhance reliability and power saving in case of channel quality deterioration, and to achieve better Quality of Service or load balancing.

Figure 8:
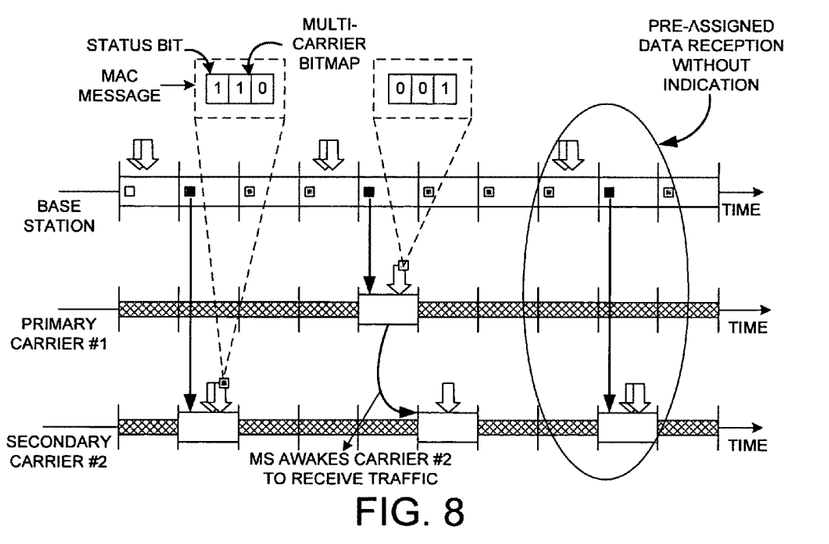
FIG. 8 illustrates one embodiment of MAC management message for carrier switching and wakeup indication and an example of sleep mode operation without traffic indication.

FIG. 8 illustrates one embodiment of a MAC management message for primary carrier switching and wakeup indication. As illustrated in FIG. 8, the MAC management message comprises a status bit followed by a multi-carrier bitmap. If the status bit is equal to zero, then the main purpose of the next listening window is used to receive data traffic, and the multi-carrier bitmap indicates on which carrier traffic will be transmitted in the next frame within the same listening window. On the other hand, if the status bit is equal to one, then the main purpose of the next listening window is used to detect traffic (i.e., for primary carrier switching), and the carrier bitmap indicates on which carrier traffic will be transmitted in the next listening window.

In the example of FIG. 8, the serving base station first transmits a MAC message with content "110" to the mobile station during its first listening window. This MAC message indicates that the second listening window will be operated on the mobile station's primary RF carrier #1 (the first bit after the status bit is set to "1"), and the main purpose of the second listening window is used to detect data traffic, such as for the purpose of primary carrier switching. The serving base station then transmits a MAC message with content "001" to the mobile station during its second listening window. This MAC message indicates that the next frame in the same listening window will be operated on the mobile station's secondary RF carrier #2 (the second bit after the status bit is set to "1"), and the main purpose of that frame is used to receive data traffic.

If data traffic is highly predictable, such as Voice of IP type of data traffic, then the mobile station may be ready to receive data traffic on one or more pre-designated carriers without detecting any traffic indicator. This is represented as TIMF=0 in multi-carrier sleep operation. Referring back to FIG. 6, when TIMF=0, one or more RF carriers are pre-designated with pre-allocated listening windows to receive data traffic (step 210). After the mobile station enters sleep mode (step 211), it then determines whether it is time for pre-allocated listening windows (step 212). If so, then the mobile station wakes up the one or more pre-designated RF carriers (step 213) to receive data traffic (step 214).

FIG. 8 also illustrates an example of multi-carrier sleep mode operation without traffic indication. In the example of FIG. 8, the secondary RF carrier #2 is a pre-designated RF carrier. When the serving base station receives data traffic in a third listening window, the mobile station subsequently wakes up the secondary RF carrier #2 for data reception without receiving any traffic indicator.

Although the present invention has been described in connection with certain specific embodiments for instructional purposes, the present invention is not limited thereto. In one embodiment, the bitmap indicator in TRF-IND can be cross-carrier assignment parameter. For a multi-carrier communication system, a downlink assignment message can indicate resource allocation for the current carrier and/or other carriers. For multi-carrier sleep mode operation, the base station can send a downlink assignment message to the mobile station with an additional parameter to assign downlink assignment for other carriers that are still not waked up yet.

In another embodiment, the concept of wakeup indicator can be implemented as early-termination indicator. Since there is one set of sleep mode parameters, the start time of listening window in secondary carriers is scheduled to be delayed by T_wakeup, compared to the start time of the listening window in primary carrier. If the early-termination indicator along with TRF-IND and the indicator represent the absence of downlink traffic of a specific secondary carrier, then the secondary carrier is not required to be waked up at the scheduled time.

In addition, although power management is the focus throughout the above description, the present invention is not limited to power management. Using FIG. 4 as an example, when the mobile station omits the initial ranging for the secondary carrier, it may use the same timing, frequency as well as power adjustment parameters for the secondary carrier as in the primary carrier for initial transmission. Later on, the mobile station may perform fine timing, frequency and power adjustment on the secondary carrier through measuring the synch and/or pilot on the secondary carrier.

Accordingly, various modifications, adaptations, and combinations of various features of the described embodiments can be practiced without departing from the scope of the invention as set forth in the claims.

What is claimed is:

1. A method of power management for a mobile station in a multi-carrier wireless network, the method comprising:
   establishing a primary connection between the mobile station and a base station by performing initial ranging to adjust power over a primary radio frequency (RF) carrier;
   performing open-loop power control and thereby obtaining long-term link measurement of the primary RF carrier;
   establishing a secondary connection between the mobile station and the base station by performing periodic ranging to adjust power over a secondary RF carrier, wherein the mobile station does not perform open-loop power control over the secondary RF carrier; and
   performing close-loop power control and thereby adjusting transmission power over an activated RF carrier only when the activated RF carrier conveys on-going data transmission.

2. The method of claim 1, wherein the periodic ranging is performed by using the link measurement of the primary RF carrier without initial ranging.

3. The method of claim 2, wherein the initial ranging and the periodic ranging are used for timing and frequency adjustment, and wherein the periodic ranging is performed by using initial frequency and timing values of the primary RF carrier.

4. The method of claim 1, further comprising:
   calculating power difference between the primary RF carrier and the secondary RF carrier; and
   adjusting transmission power of the secondary RF carrier based on the power difference.

5. The method of claim 1, further comprising;
   receiving an uplink power control message from the base station over the activated RF carrier that conveys on-going data transmission; and
   adjusting transmission power of the activated RF carrier based on the power control message.

6. The method of claim 5, wherein the activated RF carrier is either the primary RF carrier or the secondary RF carrier.

7. A mobile station in a multi-carrier wireless network, comprising:

a first RF module operable over a primary RF carrier, wherein a primary connection with a base station is established by performing initial ranging to adjust power over the primary RF carrier, and wherein open-loop power control is performed to obtain long-term link measurement of the primary RF carrier; and a second RF module operable over a secondary RF carrier, wherein a secondary connection with the base station is established by performing periodic ranging to adjust power over the secondary RF carrier, wherein the mobile station does not perform open-loop power control over the secondary RF carrier, and wherein close-loop power control is performed over the second RF carrier only when the second RF carrier conveys on-going data transmission.

8. The mobile station of claim 7, wherein the periodic ranging is performed by using the link measurement of the primary RF carrier without initial ranging.

9. The mobile station of claim 8, wherein the initial ranging and the periodic ranging are used for timing and frequency adjustment, and wherein the periodic ranging is performed by using initial frequency and timing values of the primary RF carrier.

10. The mobile station of claim 7, wherein power difference between the primary RF carrier and the secondary RF carrier is calculated, and wherein transmission power of the secondary RF carrier is adjusted based on the power difference.

11. The mobile station of claim 7, wherein close-loop power control is performed over an activated RF carrier that conveys on-going data transmission, and wherein transmission power of the activated RF carrier is adjusted based on an uplink power control message received from the base station.

12. The mobile station of claim 11, wherein the activated RF carrier is either the primary RF carrier or the secondary RF carrier.

13. A method, comprising:
   establishing a primary connection between a mobile station and a base station by performing initial ranging over a primary radio frequency (RF) carrier, wherein the mobile station performs open-loop power control over the primary RF carrier; and
   establishing a secondary connection between the mobile station and the base station by performing periodic ranging over a secondary RF carrier without performing initial ranging, wherein the mobile station does not perform open-loop power control over the secondary RF carrier; and
   performing close-loop power control and thereby adjusting transmission power over an activated RF carrier only when the activated RF carrier conveys on-going data transmission.

14. The method of claim 13, wherein the mobile station uses a set of parameters for transmission, and wherein the set of parameters comprise at least one of a timing adjustment, a frequency offset, and a power adjustment.

15. The method of claim 14, wherein the mobile station uses a first set of parameters for transmission over the primary RF carrier, and wherein the mobile station uses the same first set of parameters for initial transmission over the secondary RF carrier.

16. The method of claim 13, wherein transmission power of the activated RF carrier is adjusted based on an uplink power control message received from the base station.

17. The method of claim 13, wherein the activated RF carrier is either the primary RF carrier or the secondary RF carrier.

* * * * *